US006822677B1

(12) United States Patent
Takahashi

(10) Patent No.: US 6,822,677 B1
(45) Date of Patent: Nov. 23, 2004

(54) METHOD AND DEVICE FOR ADJUSTING WHITE BALANCE BASED ON PRIMARY COLOR SIGNALS MODULATED WITH FOURTH COLOR SIGNAL OBTAINED BY FOURTH SENSOR

(75) Inventor: Koji Takahashi, Minamiashigara (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/573,206

(22) Filed: May 19, 2000

(30) Foreign Application Priority Data

May 21, 1999 (JP) .......................................... 11/142234

(51) Int. Cl.⁷ ............................................... H04N 9/73
(52) U.S. Cl. .................................. 348/223.1; 348/279
(58) Field of Search .............................. 348/223.1, 665, 348/278, 279; 382/162, 167

(56) References Cited

U.S. PATENT DOCUMENTS

| 5,063,439 | A | * | 11/1991 | Tabei ........................ 348/272 |
| 5,249,041 | A | * | 9/1993 | Shiraishi .................. 348/224.1 |
| 5,319,449 | A | * | 6/1994 | Saito et al. .............. 348/223.1 |
| 5,489,939 | A | * | 2/1996 | Haruki et al. ............ 348/223.1 |
| 5,751,349 | A | * | 5/1998 | Matsui et al. ............ 348/228.1 |
| 6,184,940 | B1 | * | 2/2001 | Sano ........................ 348/655 |
| 6,611,289 | B1 | * | 8/2003 | Yu et al. .................. 348/265 |
| 6,621,922 | B2 | * | 9/2003 | Takaragi et al. .......... 382/162 |
| 6,628,331 | B1 | * | 9/2003 | Bean ........................ 348/273 |
| 2001/0009438 | A1 | * | 7/2001 | Kihara et al . ............ 348/223 |
| 2001/0048476 | A1 | * | 12/2001 | Nakamura et al. ......... 348/252 |

* cited by examiner

Primary Examiner—Ngoc-Yen Vu
Assistant Examiner—Nelson D. Hernandez
(74) Attorney, Agent, or Firm—Sughrue Mion, PLLC

(57) ABSTRACT

An image pickup device includes a first, second, and third sensors respectively sensitive to light in the blue, green, and red wavelength ranges, and a fourth sensor sensitive to light in a certain wavelength range between a first and second wavelengths, where spectral sensitivity distributions of the first and second sensors have peaks at the first and second wavelengths, respectively. A white balance adjusting device for adjusting a white balance in an image represented by a first, second, and third signals respectively output from the first, second, and third sensors includes a unit which inputs the first, second, and third signals and a fourth signal output from the fourth sensor, a first modulation unit which modulates the first signal according to an absolute value of a difference between the first and fourth signals, and outputs a first modulated signal, and a white balance adjustment unit which obtains a white balance based on color image data comprised of the first modulated signal and the second and third signals. Alternatively, the white balance adjusting device further includes a second modulation unit which modulates the third signal according to an absolute value of a difference between the third and fourth signals, and outputs a second modulated signal. In this case, the white balance obtains a white balance based on color image data comprised of the first and second modulated signals and the second signal.

16 Claims, 7 Drawing Sheets

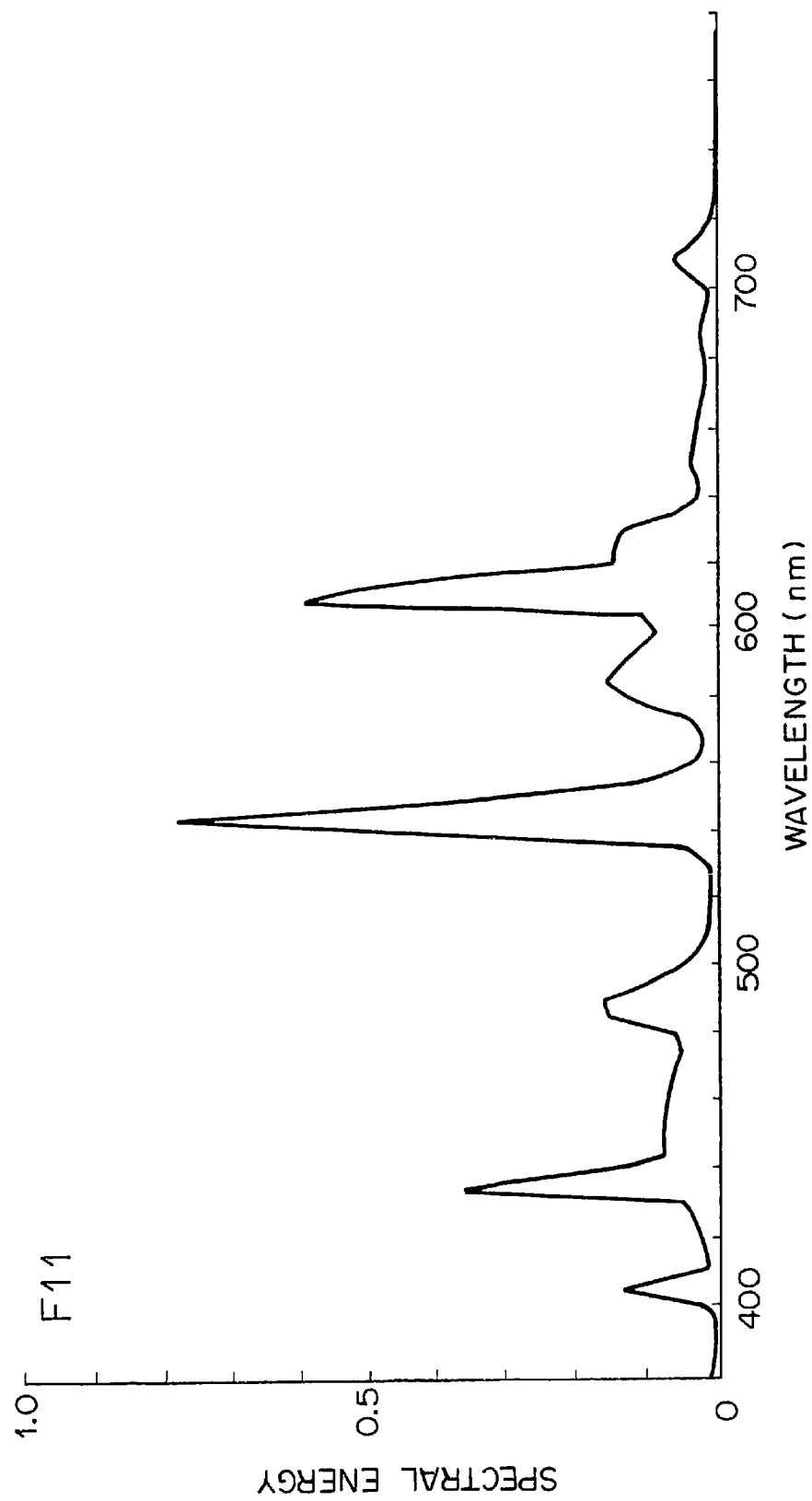

METHOD AND DEVICE FOR ADJUSTING WHITE BALANCE BASED ON PRIMARY COLOR SIGNALS MODULATED WITH FOURTH COLOR SIGNAL OBTAINED BY FOURTH SENSOR

BACKGROUND OF THE INVENTION

1. Field of the Invention

The present invention relates to a method and device for adjusting a white balance in a color image of a subject which is picked up by an image pickup device having a blue (B) sensor, a green (G) sensor, and a red (R) sensor, such as a digital camera. The present invention further relates to an image pickup device having a blue (B) sensor, a green (G) sensor, and a red (R) sensor, such as a digital camera, and being suitable for utilizing the above method and device.

2. Description of the Related Art

Many color negative films are composed of sensitive materials having such spectral sensitivities that an appropriate white balance is achieved under daylight of 5,500 K color temperature. When images are picked up under fluorescent light by using the above color negative films, greenish images are obtained. This is because the red photosensitive layers of such color negative films have relatively high spectral sensitivities on the range of longer wavelengths for separating red and green in reproduced images, and because the spectral energy of the fluorescent light is relatively low in a certain wavelength range between the blue and green wavelengths as illustrated in FIGS. 5 to 7. In order to solve the above problem, a special color negative film is proposed. In the color negative film, the high-sensitivity spectral portion of the red photosensitive layer is shifted toward the shorter wavelength side, and the fourth photosensitive layer having high spectral sensitivity in a certain wavelength range between the blue and green wavelengths is provided. By using such a color negative film, images having an appropriate white balance can be obtained under fluorescent light as well as daylight.

On the other hand, in the digital electronic still cameras (hereinafter called digital cameras), images picked up by a pickup device such as a charge-coupled device (CCD) is stored as digital image data in a storage medium such as an IC card or an internal memory provided in the digital camera. The picked up image can be reproduced based on the stored digital image data as a hard copy such as a photoprint, or a soft copy on a display screen. In this case, the white balance in the entire image is adjusted so that an image of a gray portion of a subject is reproduced in gray in the photoprint or on the display screen.

However, even in the digital cameras, the output of the image pickup device is usually adjusted so that an appropriate white balance is achieved under daylight. Therefore, when an image is picked up under fluorescent light, the white balance of the image is different. The levels of red (R) signal are sufficient since charge-coupled devices (CCD) in the digital cameras can be set so that high-sensitivity spectral portions of R sensors constituting the CCD is located on the shorter wavelength side than the high-sensitivity spectral portions of the red photosensitive layers in the color negative films. Nevertheless, under fluorescent light, the levels of blue (B) signals are relatively low compared with green (G) signals and red (R) signals. Therefore, when an image is picked up under fluorescent light by using a digital camera the output of which is adjusted under daylight, the image becomes yellowish. In this case, an image having an appropriate white balance can be obtained by adjusting the white balance based on the digital image data obtained by the digital camera.

However, when an image is picked up under mixed illumination of daylight and fluorescent light, it is difficult to achieve a white balance in the image, which is appropriate for both of the color temperatures of daylight and fluorescent light, since an appropriate white balance can be achieved for only one of the fluorescent light and the daylight.

SUMMARY OF THE INVENTION

The first object of the present invention is to provide a method for achieving an appropriate white balance in an image picked up under fluorescent light or mixed illumination of daylight and fluorescent light.

The second object of the present invention is to provide a device for achieving an appropriate white balance in an image picked up under fluorescent light or mixed illumination of daylight and fluorescent light.

The third object of the present invention is to provide an image pickup device in which an appropriate white balance can be achieved in an image picked up under fluorescent light or mixed illumination of daylight and fluorescent light.

(1) According to the first aspect of the present invention, there is provided a method for adjusting a white balance of an image represented by a first (blue), second (green), and third (red) signals which are respectively produced by a first (blue), second (green), third (red) sensors. The method comprises the steps of (a) obtaining the first (blue), second (green), and third (red) signals and a fourth signal, where the fourth signal is produced by a fourth sensor, the first (blue), second (green), and third (red) sensors are sensitive to light in a blue, green, and red wavelength ranges, the fourth sensor is sensitive to light in a certain wavelength range located between a first and second wavelengths, a spectral sensitivity distribution of the first (blue) sensor has a peak at the first wavelength, and a spectral sensitivity distribution of the second (green) sensor has a peak at the second wavelength; (b) modulating the first (blue) signal according to an absolute value of the difference between the first (blue) and fourth signals, and outputting a modulated signal; and (c) obtaining a white balance based on color image data comprised of the modulated signal and the second (green) and third (red) signals.

As mentioned before, the spectral energy of the fluorescent light is relatively low in a wavelength range between the blue and green wavelengths. Since the fourth sensor is sensitive to light in a certain wavelength range located between the peaks of the spectral sensitivities of the first (blue) and second (green) sensors, the level of the first (blue) signal is greater than the level of the fourth signal. Therefore, when the level of the first (blue) signal is modulated with the absolute value of the difference between the first (blue) and fourth signals, the level of the modulated signal can be made greater than the original first (blue) signal.

Spectral energy of some fluorescent light may not be relatively low in a certain wavelength range between the blue and green wavelengths. Even in this case, as long as a substantial difference exists between the first (blue) and fourth signals, the level of the modulated signal can be made greater than the original first (blue) signal. Therefore, when the white balance of the image represented by the second (green) and third (red) signals and the modulated signal is adjusted, the use of the modulated signal, instead of the first (blue) signal, compensates for the insufficiency of the original first (blue) signal, and consequently an image having an appropriate white balance can be obtained corresponding to the image which is originally represented by the first (blue), second (green), and third (red) signals. That is, the resultant image in which the white balance is adjusted as above does not become yellowish even when the image is picked up under fluorescent light.

(2) According to the second aspect of the present invention, there is provided a method for adjusting a white balance of an image represented by a first (blue), second (green), and third (red) signals which are respectively produced by a first (blue), second (green), third (red) sensors. The method comprises the steps of (a) obtaining the first (blue), second (green), and third (red) signals and a fourth signal, where the fourth signal is produced by a fourth sensor, the first (blue), second (green), and third (red) sensors are respectively sensitive to light in a blue, green, and red wavelength ranges, the fourth sensor is sensitive to light in a certain wavelength range located between a first and second wavelengths, a spectral sensitivity distribution of the first (blue) sensor has a peak at the first wavelength, and a spectral sensitivity distribution of the second (green) sensor has a peak at the second wavelength; (b) modulating the first (blue) signal according to an absolute value of the difference between the first (blue) and fourth signals, and outputting a first modulated signal; (c) modulating the third (red) signal according to an absolute value of the difference between the third (red) and fourth signals, and outputting a second modulated signal; and (d) obtaining a white balance based on color image data comprised of the first and second modulated signals and the second (green) signal.

When the white balance is adjusted based on the first (blue) signal, the sensitivity to light in the red wavelength range is sufficient even under fluorescent light. However, when the white balance is adjusted based on the (first) modulated signal and the second (green) and third (red) signals, sometimes the sensitivity to light in the red wavelength range becomes considerably smaller than the sensitivities to light in the blue and green wavelength ranges. In the method according to the second aspect of the present invention, the first (blue) signal is modulated with the absolute value of the difference between the third (red) and fourth signals to produce the second modulated signal, and the white balance is adjusted based on the first and second modulated signals and the second (green) signal. Since the level of the second modulated signal can be made greater than the original third (red) signal, the level of the second modulated signal can be balanced with the levels of the modulated B signal and the G signal. Therefore, the white balance can be adjusted based on the balanced color signals.

(3) According to the third aspect of the present invention, there is provided an image pickup device comprising a first (blue) sensor which is sensitive to light in a blue wavelength range, and outputs a first (blue) signal; a second (green) sensor which is sensitive to light in a green wavelength range, and outputs a second (green) signal; a third (red) sensor which is sensitive to light in a red wavelength range, and outputs a third (red) signal; and a fourth sensor which is sensitive to light in a certain wavelength range between a first and second wavelengths, and outputs a fourth signal, where a spectral sensitivity distribution of the first (blue) sensor has a peak at the first wavelength, and a spectral sensitivity distribution of the second (green) sensor has a peak at the second wavelength.

(i) The image pickup device according to the third aspect of the present invention may further comprise a modulation unit which modulates the first (blue) signal according to an absolute value of the difference between the first (blue) and fourth signals, and outputs a modulated signal, and a white balance adjustment unit which adjusts a white balance in an image represented by the first (blue), second (green), and third (red) signals, based on color image data comprised of the modulated signal and the second (green) and third (red) signals.

(ii) The image pickup device according to the third aspect of the present invention may further comprise a first modulation unit which modulates the first (blue) signal according to an absolute value of the difference between the first (blue) and fourth signals, and outputs a first modulated signal, a second modulation unit which modulates the third (red) signal according to an absolute value of the difference between the third (red) and fourth signals, and outputs a second modulated signal, and a white balance adjustment unit which adjusts a white balance in an image represented by the first (blue), second (green), and third (red) signals, based on color image data comprised of the first and second modulated signals and the second (green) signal.

(4) According to the fourth aspect of the present invention, there is provided a white balance adjusting device for adjusting a white balance of an image represented by a first (blue), second (green), and third (red) signals which are respectively produced by a first (blue), second (green), third (red) sensors. The white balance adjusting device comprises a signal input unit which inputs a first (blue), second (green), third (red), and fourth signals respectively produced by a first (blue), second (green), third (red), and fourth sensors, where the first (blue), second (green), and third (red) sensors are respectively sensitive to light in a blue, green, and red wavelength ranges, and the fourth sensor is sensitive to light in a certain wavelength range located between a first and second wavelengths, a spectral sensitivity distribution of the first (blue) sensor has a peak at the first wavelength, and a spectral sensitivity distribution of the second (green) sensor has a peak at the second wavelength; a modulation unit which modulates the first (blue) signal according to an absolute value of the difference between the first (blue) and fourth signals, and outputs a modulated signal; and a white balance adjustment unit which obtains a white balance based on color image data comprised of the modulated signal and the second (green) and third (red) signals.

(5) According to the fifth aspect of the present invention, there is provided a white balance adjusting device for adjusting a white balance of an image represented by a first (blue), second (green), and third (red) signals which are respectively produced by a first (blue), second (green), third (red) sensors. The white balance adjusting device comprises a signal input unit which inputs a first (blue), second (green), third (red), and fourth signals respectively produced by a first (blue), second (green), third (red), and fourth sensors, where the first (blue), second (green), and third (red) sensors are respectively sensitive to light in a blue, green, and red wavelength ranges, and the fourth sensor is sensitive to light in a certain wavelength range located between a first and second wavelengths, a spectral sensitivity distribution of the first (blue) sensor has a peak at the first wavelength, and a spectral sensitivity distribution of the second (green) sensor has a peak at the second wavelength; a first modulation unit which modulates the first (blue) signal according to an absolute value of the difference between the first (blue) and fourth signals, and outputs a first modulated signal; a second modulation unit which modulates the third (red) signal according to an absolute value of the difference between the third (red) and fourth signals, and outputs a second modulated signal, and a white balance adjustment unit which obtains a white balance based on color image data comprised of the first and second modulated signals and the second (green) signal.

In the first to fifth aspects of the present invention, it is preferable that the fourth sensor is sensitive to light in the wavelength range of 460 to 535 nm. It is further preferable that the fourth sensor is sensitive to light in the wavelength range of 475 to 535 nm.

BRIEF DESCRIPTION OF THE DRAWINGS

FIG. 7 a graph indicating a spectral energy distribution of the type F11 fluorescent light.

DESCRIPTION OF PREFERRED EMBODIMENTS

Detailed explanations on embodiments of the present invention are provided below with reference to drawings.

Figure 1:
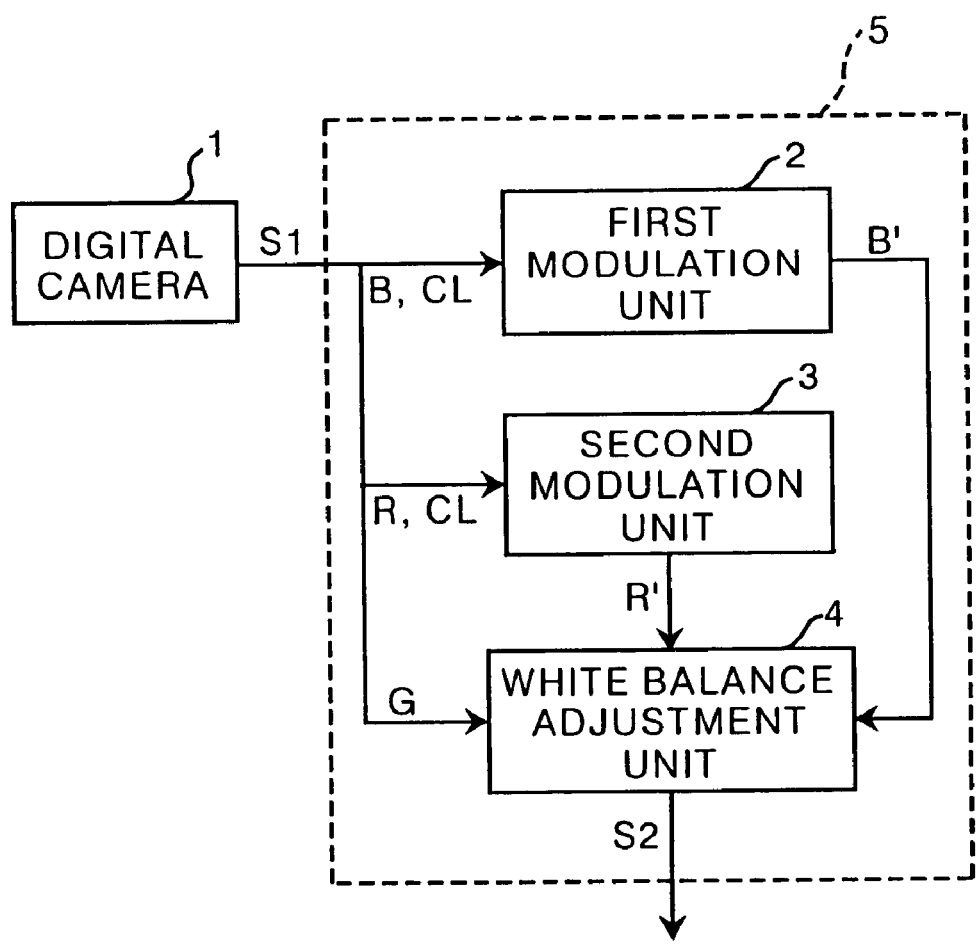
FIG. 1 is a diagram illustrating the construction of an embodiment of the present invention.

FIG. 1 is a diagram illustrating the construction of an embodiment of the present invention. In FIG. 1, reference numeral 1 denotes a digital camera, and 5 denotes a white balance adjusting device.

Figure 2:
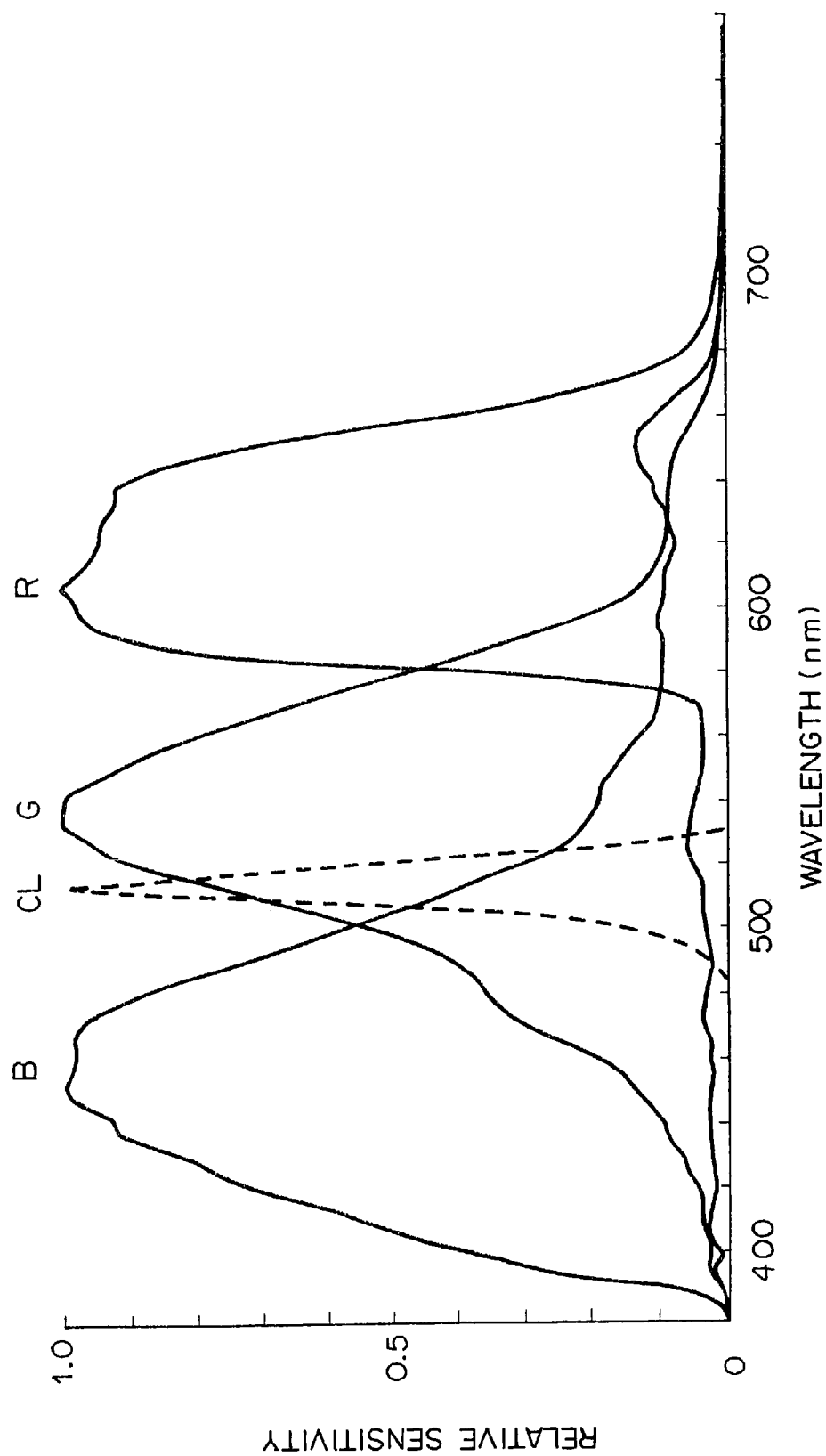
FIG. 2 is a graph of a spectral sensitivity distribution of each element of the B sensor, G sensor, R sensor, and CL sensor provided in the digital camera i the embodiment of the present invention.

The digital camera 1 in FIG. 1 is provided for picking up a color image of a subject, and comprises a B (blue) sensor, a G (green) sensor, and an R (red) sensor respectively producing a B (blue) signal, a G (green) signal, and an R (red) signal. A color image S1 is represented by the B signal, the G signal, and the R signal. The B sensor, G sensor, and R sensor each have a light sensing element for each pixel, and each element of the B sensor, G sensor, and R sensor has a spectral sensitivity distribution as illustrated in FIG. 2.

In addition to the B sensor, G sensor, and R sensor, the digital camera 1 in FIG. 1 comprises a CL sensor which produces a CL signal. The CL sensor has a light sensing element, for example, for every several pixels. The light sensing elements of the CL sensor are arranged so as to cover the entire image S1, and each light sensing element of the CL sensor is sensitive to light in a wavelength range (e.g., of 480 to 530 nm) located between two wavelengths at which the sensitivities of the B and G sensors have their peaks and preferably has a peak of sensitivity in that wavelength range, as illustrated in FIG. 2. The above B sensor, G sensor, R sensor, and CL sensor may be realized by one or more charge-coupled devices (CCDs).

The digital camera 1 and the white balance adjusting device 5 may be provided separately. Alternatively, the white balance adjusting device 5 may be contained in the digital camera 1. In the former case, data of the B signal, G signal, R signal, and CL signal may be once stored in a storage medium such as a memory card, and the white balance adjusting device 5 reads the data of the B signal, G signal, R signal, and CL signal from the storage medium by a data reading device (not shown). When the white balance adjusting device 5 is contained in the digital camera 1, data of the B signal, G signal, R signal, and CL signal are respectively supplied from the B sensor, G sensor, R sensor, and CL sensor to the white balance adjusting device 5. In this case, output data of the white balance adjusting device 5 may be stored in a storage medium such as a memory card.

The white balance adjusting device 5 is provided for adjusting the white balance of the color image S1 which is represented by the B signal, G signal, and R signal produced by the digital camera 1. The white balance adjusting device 5 comprises the first modulation unit 2, the second modulation unit 3, and the white balance adjustment unit 4, as illustrated in FIG. 1.

The first modulation unit 2 modulates the B signal according to the absolute value of the difference between the B and CL signals, and outputs a modulated B signal B'. The second modulation unit 3 modulates the R signal according to the absolute value of the difference between the R and CL signals, and outputs a modulated R signal R'. The white balance adjustment unit 4 obtains a white balance of the above image based on color image data comprised of the modulated B and R signals and the G signal, and outputs data of a white-balance-adjusted color image S2.

For example, the first modulation unit 2 in FIG. 1 calculates the modulated B signal B' by multiplying the absolute value of the difference between the B and CL signals by a coefficient β, and adding the multiplied value to the B signal, as expressed by the following equation (1).

$$B'=B+\beta|B-CL| \tag{1}$$

where the coefficient β is preferably within the range of 0.3 to 0.7. When the coefficient β P is within this range, it is possible to modulate the B signal so as to appropriately adjust the white balance of the color image.

In addition, the second modulation unit 3 calculates the modulated R signal R' by multiplying the absolute value of the difference between the R and CL signals by a coefficient α, and adding the multiplied value to the R signal, as expressed by the following equation (2).

$$R'=R+\alpha|R-CL| \tag{2}$$

where the coefficient a is preferably within the range of −0.05 to −0.15. When the coefficient α is within this range, it is possible to modulate the R signal so as to appropriately adjust the white balance of the color image.

Figure 5:
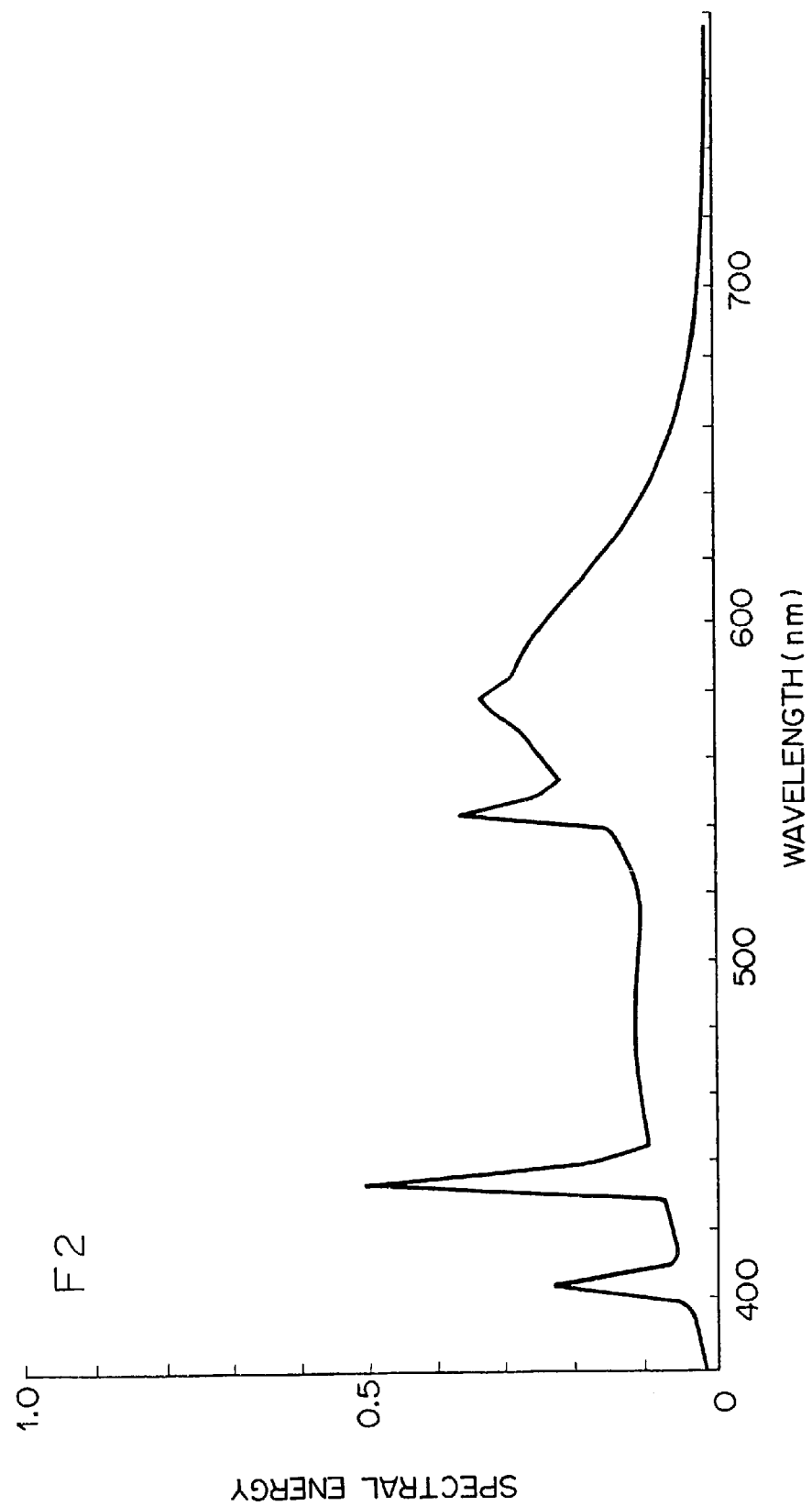
FIG. 5 a graph indicating a spectral energy distribution of the type F2 fluorescent light.
Figure 6:
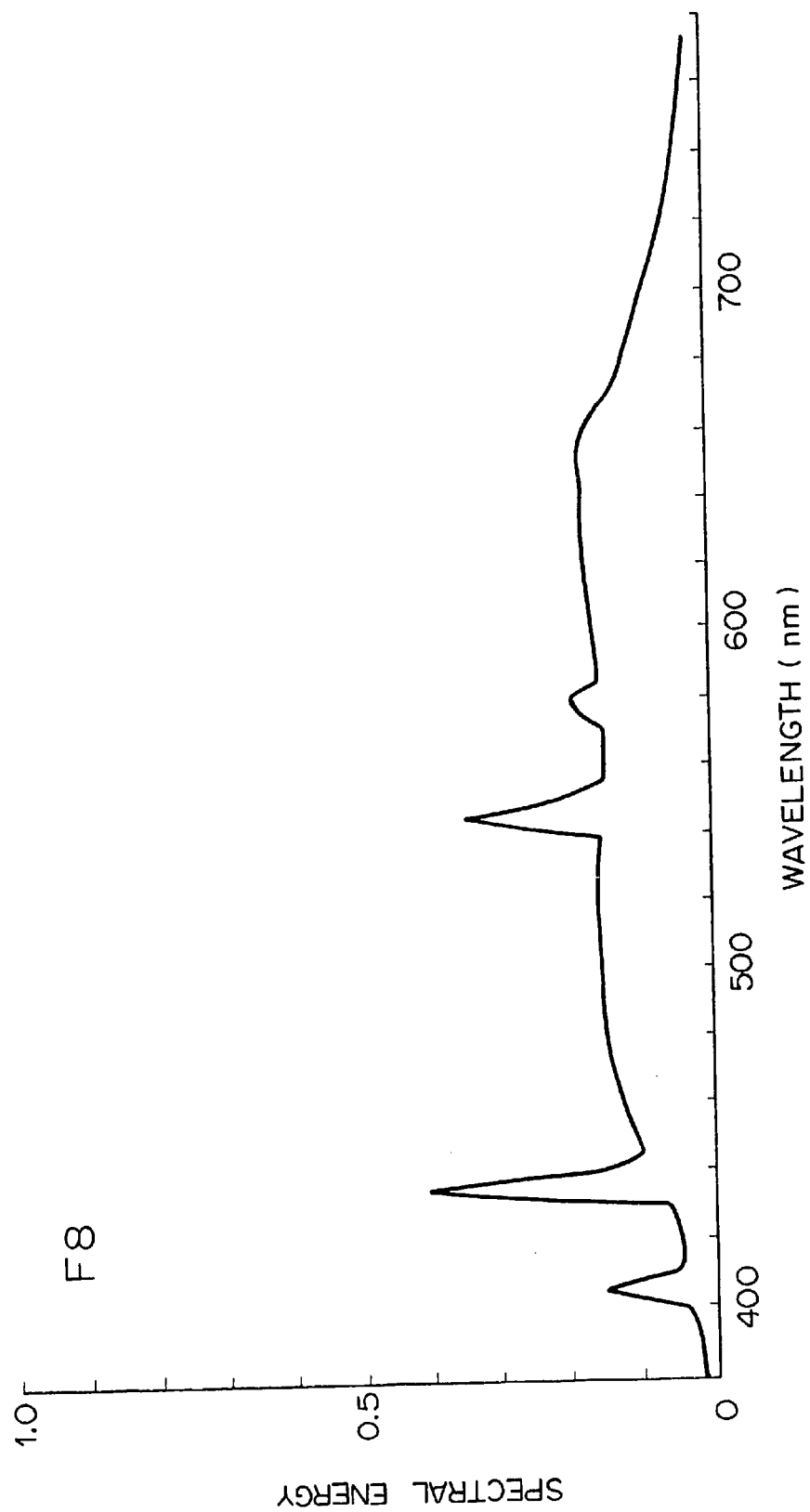
FIG. 6 a graph indicating a spectral energy distribution of the type F8 fluorescent light.

FIGS. 5 to 7 exhibit the spectral energy distributions of JIS (Japanese Industrial Standard) Z8719, Types F2, F8, and F11 as three typical types of fluorescent light. The type F11 fluorescent light illustrated in FIG. 7 is a so-called three-wavelength type, which is designed to have almost identical amounts of spectral energy in the blue, green, and red wavelength ranges. The type F2 fluorescent light illustrated in FIG. 5 and the type F11 fluorescent light illustrated in FIG. 7 have relatively low spectral energy distributions in the wavelength range of 440 to 535 nm. In particular, the type F11 fluorescent light has an extremely low spectral energy distribution in the wavelength range of 500 to 530 nm. On the other hand, in the case of the type F8 fluorescent light illustrated in FIG. 6, the spectral energy distribution is not so low in the wavelength range of 440 to 535 nm.

Therefore, in the case of the type F2 fluorescent light illustrated in FIG. 5 or the type F11 fluorescent light illustrated in FIG. 7, the level of the B signal is greater than the level of the CL signal in the wavelength range between the B and G wavelength ranges. Thus, when the B signal is modulated with the absolute value of the difference between the B signal and the CL signal in accordance with the equation (1), the level of the modulated B signal B' becomes greater than the level of the B signal. In addition, even when the difference between the B signal and the CL signal is small, as in the case of the type F8 fluorescent light illustrated in FIG. 6, the level of the modulated B signal B' becomes greater than the level of the B signal as long as there is a difference between the B signal and the CL signal.

The white balance adjustment unit 4 in FIG. 1 first obtains average values of the modulated B signal B', the G signal, and the modulated R signal R' as average values Bm, Gm, and Rm in the B, G, and R channels, respectively. Then, the white balance adjustment unit 4 converts the modulated B signal B', the G signal, and the modulated R signal R' into white-balance-adjusted signals B", G", and R", respectively, so that the average values of the white-balance-adjusted signals B", G", and R" in the B, G, and R channels become identical. For example, the white balance adjustment unit 4 converts the modulated B signal B', the G signal, and the modulated R signal R' so as to make each of the average values of the white-balance-adjusted signals B" and R" identical with the average value Gm of the other white-balance-adjusted signal G", as expressed in the following set of equations (3).

$$B''=B'\cdot Gm/Bm$$

$$G''=G'\cdot Gm/Gm \quad (3)$$

$$R''=R'\cdot Gm/Rm$$

The above white-balance-adjusted signals B", G", and R" are output from the white balance adjustment unit 4 as white-balance-adjusted color image data S2. When the white-balance-adjusted color image data S2 are input into an image reproducing means such as a printer or a display unit, the image of the subject can be reproduced with an appropriate white balance.

Figure 3:
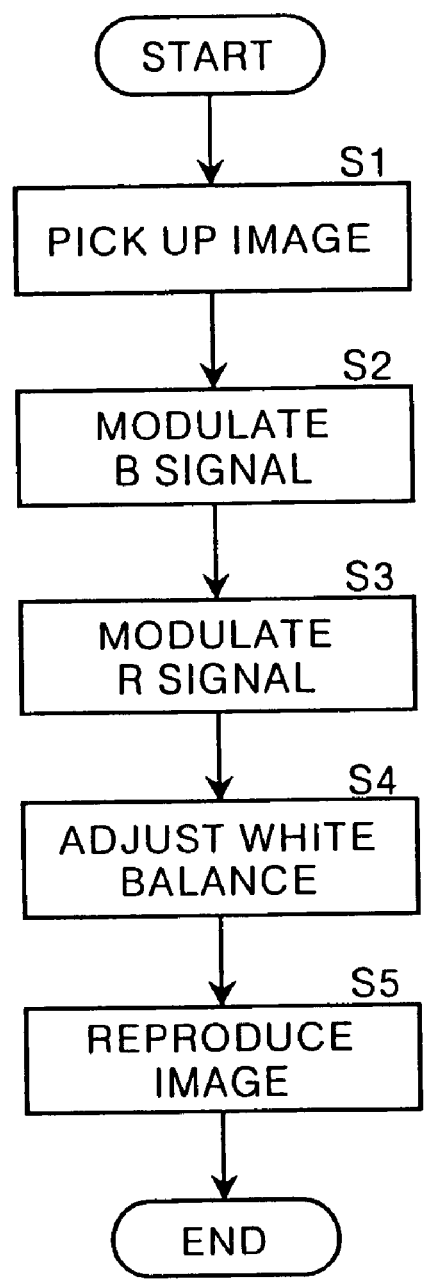
FIG. 3 is a flowchart of the operation of the embodiment of the present invention.

FIG. 3 is a flowchart of the operation of the embodiment of the present invention.

In step S1, an image of a subject is picked up by the digital camera 1, and the color image data S1 comprised of the B signal, G signal, R signal, and CL signal are obtained. Then, the color image data S1 is input into the white balance adjusting device 5. In step S2, the modulated B signal B' is obtained by the first modulation unit 2 in accordance with the equation (1). In addition, in step S3, the modulated R signal R' is obtained by the second modulation unit 3 in accordance with the equation (2). Next, in step S4, the white balance is adjusted by the white balance adjustment unit 4, and the white-balance-adjusted color image data S2 is obtained. Finally, In step S5, the white-balance-adjusted color image data S2 is supplied to the image reproducing means such as a printer or a CRT display unit, and the image of the subject of the subject is reproduced.

The effect of the present invention is indicated below in some concrete examples.

Figure 4:
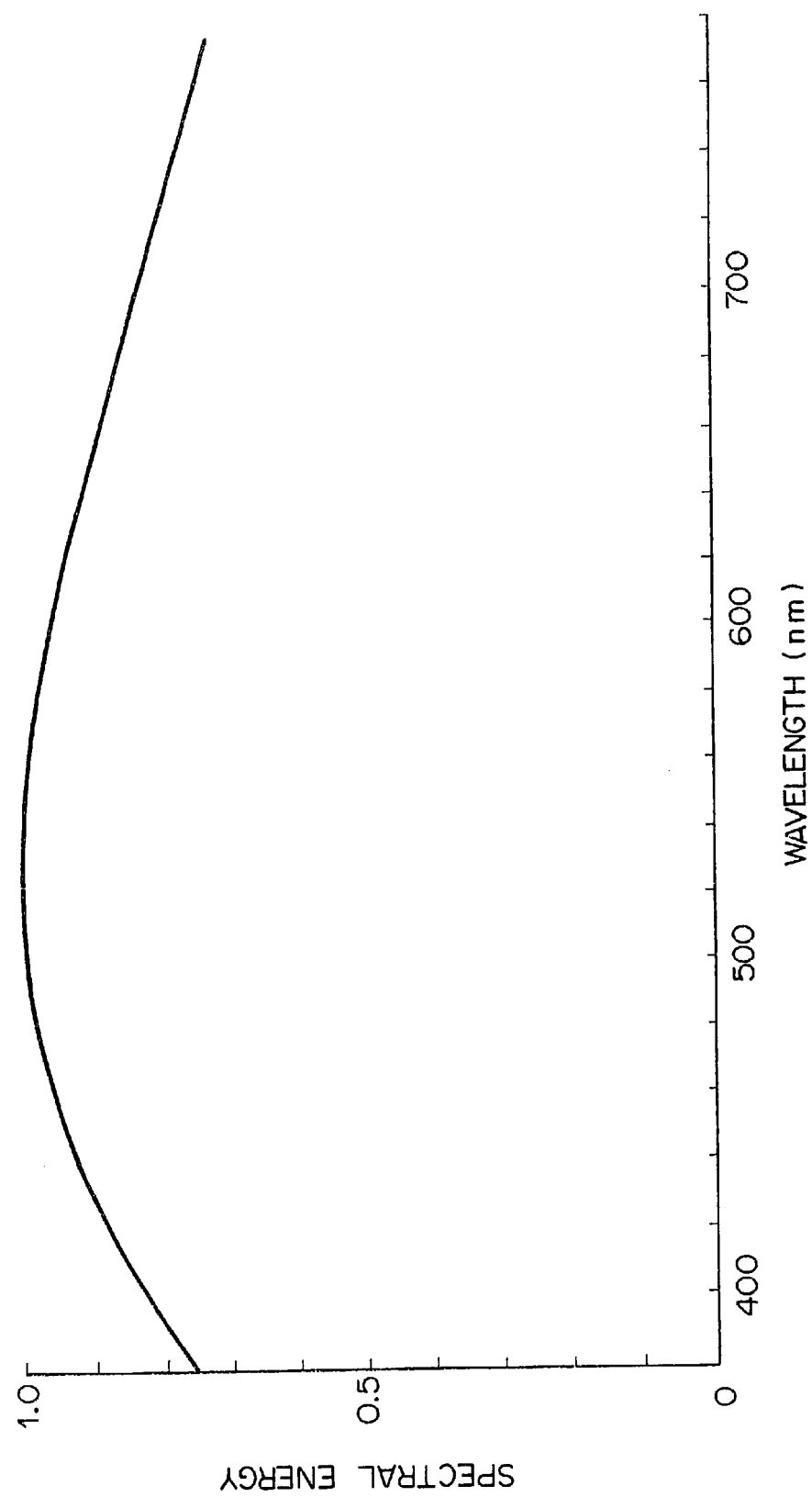
FIG. 4 is a graph indicating a spectral energy distribution of daylight.

First, the levels of the B, G, R, and CL signals output from the digital camera 1 are adjusted so that B=G=R=CL=1.0 under daylight of 5,500 K color temperature, which has a spectral energy distribution as illustrated in FIG. 4. Thereafter, the illumination is changed from the daylight to the fluorescent light of the type F2, F8, or F11. Table 1 indicates the values of the B, G, R, and CL signals after the change of the illumination to the fluorescent light of the types F2, F8, and F11, where the fluorescent light is adjusted so that the value of the G signal is 1.0

TABLE 1

| Fluorescent | Sensor Output | | | |
|---|---|---|---|---|
| Light | B | G | R | CL |
| F2 | 0.76 | 1.00 | 0.96 | 0.58 |
| F8 | 0.87 | 1.00 | 1.05 | 0.92 |
| F11 | 0.72 | 1.00 | 1.12 | 0.13 |

Table 2 indicates the values of the modulated B signal B' obtained from the values of the B and CL signals indicated in Table 1, in accordance with the equation (1) with the coefficient values β=0, 0.5, and 1.0.

TABLE 2

| Fluorescent | Modulated B Signal Value | | |
|---|---|---|---|
| Light | β = 0 | β = 0.5 | β = 1.0 |
| F2 | 0.76 | 0.85 | 0.94 |
| F8 | 0.87 | 0.90 | 0.92 |
| F11 | 0.72 | 1.02 | 1.31 |

As indicated in Table 2, the value of the modulated B signal B' approaches nearest 1.0 when β=1.0 in the cases of the type F2 or F8 fluorescent light, or when β=0.5 in the cases of the type F11 fluorescent light. Therefore, when the B signal is modulated in accordance with the equation (1) by using an appropriate coefficient value β corresponding to the type of the fluorescent light, the insufficiency of the original B signal is compensated for by the modulation of the B signal, and the resultant image does not become yellowish even under illumination of fluorescent light. That is, an appropriate white balance can be achieved.

On the other hand, Table 3 indicates the values of the modulated R signal R' obtained from the values of the R and CL signals indicated in Table 1, in accordance with the equation (2) with the coefficient values α=0, −0.1, and −0.2.

TABLE 3

| Fluorescent | Modulated R Signal Value | | |
|---|---|---|---|
| Light | α = 0 | α = −0.1 | α = −0.2 |
| F2 | 0.96 | 0.92 | 0.88 |
| F8 | 1.05 | 1.03 | 1.02 |
| F11 | 1.12 | 1.02 | 0.92 |

Since the values of the R signal indicated in Table 1 are originally near 1.00, the R signal can be sufficiently modulated by using a relatively small coefficient value α. That is, as indicated in Table 3, the value of the modulated R signal R' under the fluorescent light of the type F2 is nearest 1.0 in the case where α=0, i.e., when the R signal is not modulated. In addition, the value of the modulated R signal R' under the fluorescent light of the type F8 is nearest 1.0 in the case where α=−0.2, and the value of the modulated R signal R' under the fluorescent light of the type F11 is nearest 1.0 in the case where α=−0.1. Therefore, when the R signal is modulated in accordance with the equation (2) by using an appropriate coefficient value α corresponding to the type of the fluorescent light, the modulated R signal R' is balanced with the modulated B signal B', and thus an appropriate white balance can be achieved.

In order to evaluate a total effect of improving the white balance by varying the coefficients α and β, i.e., in order to evaluate to how near to the daylight gray the image of the white-balance-adjusted color image data S2 is, the modulated B signal B', the G signal, and the modulated R signal R' are converted into chromaticity values, and a degree of deviation of the chromaticity values of the white-balance-adjusted color image data S2 from the chromaticity values (0.333, 0.333) of the daylight gray is obtained as a norm N. The chromaticity values of the white-balance-adjusted color image data S2 and the norm N are respectively obtained by using the following equations (4) and (5).

$$g=G/(B'+G+R')$$
$$r=R'/(B'+G+R') \quad (4)$$
$$N=\sqrt{(g-0.333)^2+(r-0.333)^2} \quad (5)$$

The values of the norm N are obtained for all the combinations of the coefficients values $\beta=0, 0.5$, and $1.0$ and $\alpha=0, -0.1$, and $-0.2$, and the types F2, F8, and F11 of the fluorescent light.

TABLE 4

| Fluorescent Light | Norm N ($\alpha = 0$) | | |
|---|---|---|---|
|  | $\beta = 0$ | $\beta = 0.5$ | $\beta = 1.0$ |
| F2 | 0.039 | 0.023 | 0.011 |
| F8 | 0.027 | 0.023 | 0.019 |
| F11 | 0.064 | 0.028 | 0.043 |
| AVERAGE | 0.043 | 0.025 | 0.024 |

Table 4 indicates the values of the norm N for all the combinations of the coefficients values $\beta=0, 0.5$, and $1.0$ and the types F2, F8, and F11 of the fluorescent light in the case where $\alpha=0$, and Table 5 indicates the average values of the norm N for all the combinations of the coefficients values $\beta=0, 0.5$, and $1.0$ and $\alpha=0, -0.1$, and $-0.2$, where each average value of the norm N are obtained by averaging the values of the norm N for the types F2, F8, and F1 of the fluorescent light.

TABLE 5

|  | $\beta = 0$ | $\beta = 0.5$ | $\beta = 1.0$ |
|---|---|---|---|
| $\alpha = 0$ | 0.043 | 0.025 | 0.024 |
| $\alpha = -0.1$ | 0.039 | 0.018 | 0.028 |
| $\alpha = -0.2$ | 0.038 | 0.024 | 0.033 |

As indicated in Table 5, the minimum value, 0.018 of the norm N (average) is obtained in the case where $\alpha=-0.1$ and $\beta=0.5$, while the value of the norm N (average) is 0.043 when neither of the B signal and the R signal is modulated. Therefore, the white balance is improved by 60% according to the above evaluation based on the norm N defined by the equation (5).

Although both of the B signal and the R signal are modulated in the above embodiment, the white balance can be improved when only the B signal is modulated. In this case, the second modulation unit 3 in the white balance adjusting device 5 in FIG. 1 can be dispensed with.

In addition, all of the contents of the Japanese Patent Application No. 11(1999)-142234 are incorporated into this specification by reference.

What is claimed is:

1. A method for adjusting a white balance of an image represented by a first, second, and third signals which are respectively produced by a first, second, third sensors, comprising the steps of:

(a) obtaining said first, second, and third signals and a fourth signal, where the fourth signal is produced by a fourth sensor, the first, second, and third sensors are respectively sensitive to light in a blue, green, and red wavelength ranges, the fourth sensor is sensitive to light in a certain wavelength range located between a first and second wavelengths, a spectral sensitivity distribution of the first sensor has a peak at the first wavelength, and a spectral sensitivity distribution of the second sensor has a peak at the second wavelength;

(b) modulating said first signal according to an absolute value of a difference between said first and fourth signals, and outputting a modulated signal; and (c) obtaining a white balance based on color image data comprised of said modulated signal and said second and third signals.

2. A method for adjusting a white balance of an image represented by a first, second, and third signals which are respectively produced by a first, second, third sensors, comprising the steps of:

(a) obtaining said first, second, and third signals and a fourth signal, where the fourth signal is produced by a fourth sensor, the first, second, and third sensors are respectively sensitive to light in a blue, green, and red wavelength ranges, the fourth sensor is sensitive to light in a certain wavelength range located between a first and second wavelengths, a spectral sensitivity distribution of the first sensor has a peak at the first wavelength, and a spectral sensitivity distribution of the second sensor has a peak at the second wavelength;

(b) modulating said first signal according to an absolute value of a difference between said first and fourth signals, and outputting a first modulated signal;

(c) modulating said third signal according to an absolute value of a difference between said third and fourth signals, and outputting a second modulated signal; and (d) obtaining a white balance based on color image data comprised of said first and second modulated signals and said second signal.

3. An image pickup device comprising:

a first sensor which is sensitive to light in a blue wavelength range, and outputs a first signal;

a second sensor which is sensitive to light in a green wavelength range, and outputs a second signal;

a third sensor which is sensitive to light in a red wavelength range, and outputs a third signal; and a fourth sensor which is sensitive to light in a certain wavelength range between a first and second wavelengths, and outputs a fourth signal, where a spectral sensitivity distribution of said first sensor has a peak at the first wavelength, and a spectral sensitivity distribution of said second sensor has a peak at the second wavelength.

wherein the peak at the second wavelength is in the range of 520 to 550 nm.

4. An image pickup device comprising:

a first sensor which is sensitive to light in a blue wavelength range, and outputs a first signal;

a second sensor which is sensitive to light in a green wavelength range, and outputs a second signal;

a third sensor which is sensitive to light in a red wavelength range, and outputs a third signal;

a fourth sensor which is sensitive to light in a certain wavelength range between a first and second wavelengths, and outputs a fourth signal, where a spectral sensitivity distribution of said first sensor has a peak at the first wavelength, and a spectral sensitivity distribution of said second sensor has a peak at the second wavelength, a modulation unit which modulates said first signal according to an absolute value of a difference between said first and fourth signals, and outputs a modulated signal, and a white balance adjustment unit which adjusts a white balance in an image represented by the first, second, and third signals, based on color image data comprised of the modulated signal and the second and third signals.

5. An image pickup device comprising:

a first sensor which is sensitive to light in a blue wavelength range, and outputs a first signal;

a second sensor which is sensitive to light in a green wavelength range, and outputs a second signal;

a third sensor which is sensitive to light in a red wavelength range, and outputs a third signal;

a fourth sensor which is sensitive to light in a certain wavelength range between a first and second wavelengths, and outputs a fourth signal, where a spectral sensitivity distribution of said first sensor has a peak at the first wavelength, and a spectral sensitivity distribution of said second sensor has a peak at the second wavelength, a first modulation unit which modulates said first signal according to an absolute value of a difference between said first and fourth signals, and outputs a first modulated signal, a second modulation unit which modulates said third signal according to an absolute value of a difference between said third and fourth signals, and outputs a second modulated signal, and a white balance adjustment unit which adjusts a white balance in an image represented by the first, second, and third signals, based on color image data comprised of the first and second modulated signals and the second signal.

6. An image pickup apparatus according to claim 5, wherein said first modulation unit calculates the first modulated signal by multiplying the absolute value of the difference between said first and fourth signals by a coefficient $\beta$, and adding the multiplied value to the first signal, as expressed by the following equation;

$$B'=B+\beta|B-CL|$$

where B' is the first modulated signal, B is the first signal, CL is the fourth signal, and the coefficient $\beta$ is within the range of 0.3 to 0.7.

7. An image pickup apparatus according to claim 5, wherein said second modulation unit calculates the second modulated signal by multiplying the absolute value of the difference between said third and fourth signals by a coefficient $\alpha$, and adding the multiplied value to the third signal, as expressed by the following equation;

$$R'=R+\alpha|R-CL|$$

where R' is the second modulated signal, R is the third signal, CL is the fourth signal, and the coefficient $\alpha$ is within the range of −0.05 to −0.15.

8. An image pickup apparatus according to claim 5, wherein said white balance adjustment unit first obtains average values (of the first modulated signal B' the second signal G, and the second modulated signal R' as average values Bm, Gm, and Rm in B, G, and R channels, respectively, and then converts the first modulated signal B', the second signal G, and the second modulated signal R' into white-balance-adjusted signals B", G", and R", respectively, so that the average values of the white-balance-adjusted signals B", G", and R" in the B, G, and R channels become identical.

9. An image pickup apparatus according to claim 8, wherein said white balance adjustment unit converts the first modulated signal B', the second signal G, and the second modulated signal R' so as to make each of the average values of the white-balance-adjusted signals B" and R" identical with the average value Gm of the other white-balance-adjusted signal G", as expressed in the following set of equations;

$$B"=B'Gm/Bm,$$

$$G"=G'Gm/Gm,$$

$$R"=R'Gm/Rm.$$

10. A white balance adjusting device for adjusting a white balance of an image represented by a first, second, and third signals which are respectively produced by a first, second, third sensors, comprising:

a signal input unit which inputs said first, second, and third signals and a fourth signal, where the fourth signal is produced by a fourth sensor, the first, second, and third sensors are respectively sensitive to light in a blue, green, and red wavelength ranges, the fourth sensor is sensitive to light in a certain wavelength range located between a first and second wavelengths, a spectral sensitivity distribution of the first sensor has a peak at the first wavelength, and a spectral sensitivity distribution of the second sensor has a peak at the second wavelength;

a modulation unit which modulates said first signal according to an absolute value of a difference between said first and fourth signals, and outputs a modulated signal; and a white balance adjustment unit which obtains a white balance based on color image data comprised of said modulated signal and said second and third signals.

11. A white balance adjusting device for adjusting a white balance of an image represented by a first, second, and third signals which are respectively produced by a first, second, third sensors, comprising:

a signal input unit which inputs said first, second, and third signals and a fourth signal, where the fourth signal is produced by a fourth sensor, the first, second, and third sensors are respectively sensitive to light in a blue, green, and red wavelength ranges, the fourth sensor is sensitive to light in a certain wavelength range located between a first and second wavelengths, a spectral sensitivity distribution of the first sensor has a peak at the first wavelength, and a spectral sensitivity distribution of the second sensor has a peak at the second wavelength;

a first modulation unit which modulates said first signal according to an absolute value of a difference between said first and fourth signals, and outputs a first modulated signal;

a second modulation unit which modulates said third signal according to an absolute value of a difference between said third and fourth signals, and outputs a second modulated signal, and a white balance adjustment unit which obtains a white balance based on color image data comprised of said first and second modulated signals and said second signal.

12. A white balance adjusting device according to claim 11, wherein said first modulation unit calculates the first modulated signal by multiplying the absolute value of the difference between said first and fourth signals by a coefficient β and adding the multiplied value to the first signal, as expressed by the following equation;

$$B'=B+\beta|B-CL|$$

where B' is the first modulated signal, B is the first signal, CL is the fourth signal, and the coefficient β is within the range of 0.3 to 0.7.

13. A white balance adjusting device according to claim 11, wherein said second modulation unit calculates the second modulated signal by multiplying the absolute value of the difference between said third and fourth signals by a coefficient a, and adding the multiplied value to the third signal, as expressed by the following equation;

$$R'=R+\alpha|R-CL|$$

where R' is the second modulated signal, R is the third signal, CL is the fourth signal, and the coefficient a is within the range of −0.05 to −0.15.

14. A white balance adjusting device according to claim 11, wherein said white balance adjustment unit first obtains average values of the first modulated signal B' the second signal G, and the second modulated signal R' as average values Bm, Gm, and Rm in B, G, and R channels, respectively, and then converts the first modulated signal B', the second signal G, and the second modulated signal R' into white-balance-adjusted signals B", G", and R", respectively, so that the average values of the white-balance-adjusted signals B", G", and R" in the B, G, and R channels become identical.

15. A white balance adjusting device according to claim 14, wherein said white balance adjustment unit converts the first modulated signal B', the second signal G, and the second modulated signal R' so as to make each of the average values of the white-balance-adjusted signals B" and R" identical with the average value Gm of the other white-balance-adjusted signal G", as expressed in the following set of equations;

$$B''=B'Gm/Bm,$$

$$G''=G'Gm/Gm,$$

$$R''=R'Gm/Rm.$$

16. An image pickup device comprising:
a first sensor which is sensitive to light in a blue wavelength range, and outputs a first signal;
a second sensor which is sensitive to light in a green wavelength range, and outputs a second signal;
a third sensor which is sensitive to light in a red wavelength range, and outputs a third signal; and
a fourth sensor which is sensitive to light in a certain wavelength range between a first and second wavelengths, and outputs a fourth signal, where a spectral sensitivity distribution of said first sensor has a peak at the first wavelength, and a spectral sensitivity distribution of said second sensor has a peak at the second wavelength,
wherein the peak at the second wavelength is approximately 540 nm.

* * * * *